United States Patent [19]
Ghosal et al.

[11] Patent Number: 5,910,533
[45] Date of Patent: Jun. 8, 1999

[54] ELASTOMERIC MATERIAL FOR RUBBER ARTICLES

[75] Inventors: Kanchan Ghosal, Richardson, Tex.; Venkataram Krishnan, Cary, N.C.

[73] Assignee: Reichhold Chemicals, Inc., Durham, N.C.

[21] Appl. No.: 08/918,719

[22] Filed: Aug. 4, 1997

[51] Int. Cl.$^6$ .................................................. C08L 33/06
[52] U.S. Cl. ............................................ 524/560; 526/340
[58] Field of Search ............................ 524/560; 526/340

[56] References Cited

U.S. PATENT DOCUMENTS

| | | | |
|---|---|---|---|
| 2,527,162 | 10/1950 | Vanderbilt et al. | 260/80.7 |
| 2,574,894 | 11/1951 | Synder et al. | 260/84.3 |
| 2,575,135 | 11/1951 | Schulze et al. | 260/84.1 |
| 2,959,821 | 11/1960 | Kolb | 18/58.6 |
| 3,174,953 | 3/1965 | Ogle | 260/83.7 |
| 4,963,623 | 10/1990 | Miller et al. | 525/237 |
| 5,014,362 | 5/1991 | Tillotson et al. | 2/168 |
| 5,039,750 | 8/1991 | Miller et al. | 525/237 |
| 5,045,611 | 9/1991 | McNeil | 526/81 |
| 5,061,765 | 10/1991 | Hsu | 526/141 |
| 5,081,178 | 1/1992 | Angel | 524/521 |
| 5,084,514 | 1/1992 | Suczechura et al. | 525/123 |
| 5,143,971 | 9/1992 | Stanislawczyk | 526/318.2 |
| 5,177,164 | 1/1993 | De Vries et al. | 526/82 |
| 5,195,537 | 3/1993 | Tillotson | 128/844 |
| 5,206,319 | 4/1993 | Kobayashi et al. | 526/224 |
| 5,284,157 | 2/1994 | Miller et al. | 128/844 |
| 5,284,607 | 2/1994 | Chen | 264/37 |
| 5,338,565 | 8/1994 | Shlenker et al. | 427/2.25 |
| 5,370,900 | 12/1994 | Chen | 427/2.3 |
| 5,405,666 | 4/1995 | Brindle | 428/36.4 |
| 5,484,840 | 1/1996 | Binkley | 524/501 |
| 5,514,763 | 5/1996 | Kmiecik-Lawrynowicz et al. | 526/340 |
| 5,700,852 | 12/1997 | Iwanaga | 524/460 |

FOREIGN PATENT DOCUMENTS

| | | | |
|---|---|---|---|
| 795706 | 2/1956 | Canada. | |
| 0429932A2 | 6/1991 | European Pat. Off. | G03C 1/76 |
| 59-129213 | 7/1984 | Japan | C08F 2/22 |
| 536144 | 1/1977 | U.S.S.R. | C04B 33/04 |

OTHER PUBLICATIONS

Reichold Product Bulletin (Jan. 1993).

*Primary Examiner*—Paul R. Michl
*Attorney, Agent, or Firm*—Myers Bigel Sibley & Sajovec

[57] ABSTRACT

A polymer latex composition suitable for making rubber articles comprises about 80 to about 99 weight percent of a conjugated diene monomer; above 0 to about 10 weight percent of an unsaturated acid monomer; and from 0 to about 20 weight percent of an additional unsaturated monomer. The polymer latex composition has a glass transition temperature of no greater than about −50° C.

23 Claims, No Drawings

ELASTOMERIC MATERIAL FOR RUBBER ARTICLES

FIELD OF THE INVENTION

The invention relates to polymer latex compositions useful in making rubber articles. More specifically, the invention relates to polymer latex compositions which are capable of forming materials possessing a combination of physical properties.

BACKGROUND OF THE INVENTION

Rubber articles such as gloves, condoms, bags, and the like are formed of latex polymeric materials and are useful in a wide variety of applications relating to, for example, medical, industrial, and household uses. These polymeric materials are generally water-based polymers which are readily formed using commercially-known processes. In such processes, it is important that the latex material be able to form a film on the surface of a mold. An example of such use relates to the making of latex gloves, especially for medical applications. Latex gloves are preferred since they can be made light, thin, flexible, tight-fitting, and substantially impermeable to a variety of liquids and gases. It is often desirable that the gloves possess adequate physical properties such as tensile strength and elongation, and are comfortable to the wearer.

It is also desirable that the gloves possess adequate aesthetic properties with respect to drape, softness, etc., provide a good barrier to microbial penetration, and be substantially odorless. A combination of high tensile strength and elongation combined with a low modulus is typically preferred. In addition to the above, it is desirable that the glove have sufficient snap or elastic recovery.

Conventional latex gloves have typically been formed of natural rubber primarily due to their resiliency, softness, adequate physical properties, and good elastic recovery. Nonetheless, many wearers of such gloves are allergic to proteins found in natural rubber. These individuals often experience difficulty when wearing the gloves. As a result, there have been efforts to develop gloves made from synthetic materials which are comparable to the natural rubber gloves in terms of comfort and physical properties. One synthetic alternative focuses on using poly(vinylchloride) (PVC). PVC is typically plasticized in order to be pliable enough to use in glove applications. Gloves formed from PVC are undesirable in many respects. For example, the gloves do not possess a soft and rubbery feel. Furthermore, the plasticizer may migrate through the PVC and leach out when in contact with solvents. Also, it is believed that synthetic gloves formed from vinyl materials may provide an insufficient barrier to microbes due to imperfections in the film. Additionally, these gloves tend to display inadequate elastic recovery (snap) properties and poor softness.

Another possible alternative to gloves made of natural rubber is described in U.S. Pat. No. 5,014,362 to Tillotson et al. The Tillotson et al. patent proposes gloves made with elastomeric material which allegedly possess adequate physical properties relating to fluid permeability, strength, and resilience. The gloves are taught to be formed from a nitrile-containing rubber, more particularly a carboxylated nitrile containing butadiene rubber. Nitrile-containing rubber gloves are typically desirable in demanding end use applications, such as those which often require superior properties such as solvent and puncture resistance.

Nonetheless, for more general, less demanding applications, it is often not necessary for the gloves to exhibit such properties. The nitrile-containing rubber gloves also often display inferior snap and softness properties. A need in the art remains for a synthetic latex material suitable in forming rubber articles such as gloves which is free of natural rubber proteins and which can provide an adequate barrier to microbial penetration. The articles should also possess a wide range of desirable physical properties relating to strength, elongation, and modulus, as well as providing adequate aesthetic properties relating to, for example, drape. It is highly desirable that the articles possess improved properties with respect to elastic recovery (snap) and softness. In addition, it would be desirable to be able to make the synthetic latex articles by using existing commercial processes.

SUMMARY OF THE INVENTION

In view of the above, it is an object of the present invention to provide a polymer latex suitable in forming rubber articles which is free of natural rubber proteins and imparts desirable physical properties to articles made therefrom.

It is also an object of the invention to provide a polymer latex suitable in forming rubber articles which is free of natural rubber proteins and possesses good aesthetic properties relating to, for example, drape.

It is an additional object of the present invention to provide a polymer latex suitable in forming rubber articles which possess improved softness and elastic recovery (snap) properties.

It is yet another object of the present invention to provide polymer latex compositions utilized in rubber articles which may be formed using existing commercial processes.

To these ends and others, in one aspect, the present invention provides a polymer latex composition suitable for making rubber articles. The composition comprises from about 80 to about 99 weight percent of a conjugated diene monomer; from above 0 to about 10 weight percent of an unsaturated acid monomer, and from 0 to about 20 weight percent of an additional unsaturated monomer. The polymer latex composition has a glass transition temperature of no greater than about −50° C. The weight percents are based on the total weight of the monomers. A preferred conjugated diene monomer is 1,3-butadiene. A preferred unsaturated acid monomer is methacrylic acid.

In another aspect, the invention provides a crosslinked film formed from a polymer latex composition. Preferably, the crosslinked film has a tensile strength of at least about 1000 psi, an elongation of at least about 600 percent, and a modulus at 100 percent elongation of no more than about 300 psi.

In yet another aspect, the invention provides a glove formed from the polymer latex composition of the invention. Preferably, the glove has a tensile strength of at least about 1000 psi, an elongation of at least about 600 percent, and a modulus at 100 percent elongation of no more than about 300 psi.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The invention relates to a polymer latex composition suitable for making rubber articles. The polymer latex composition comprises from about 80 to about 99 weight percent of a conjugated diene monomer, from above 0 to about 10 weight percent of an unsaturated acid monomer, and from 0 to about 20 weight percent of a additional unsaturated monomer. The weight percents are based on the total weight of the monomers.

The polymer latex composition of the invention has a glass transition temperature ($T_g$) of no greater than about −50° C., and more preferably no greater than about −65° C. Although Applicants do not wish to be bound by any theories, it is believed that the glass transition temperature of the composition imparts desirable aesthetic properties such as softness and drape to articles of manufacture made therefrom. Simultaneously, other physical properties relating to, for example, elongation, modulus, elastic recovery (snap), and tensile strength are maintained through crosslinking.

Suitable conjugated diene monomers that may be used include, but are not limited to, $C_4$ to $C_9$ dienes such as, for example, butadiene monomers such as 1,3-butadiene, 2-methyl-1,3-butadiene, 2 chloro-1,3-butadiene, and the like. Blends or copolymers of the diene monomers can also be used. In addition to the composition range set forth herein, the conjugated diene may be used in an amount, based on the total weight of the monomers, preferably from about 80 to about 95 percent by weight. A particularly preferred conjugated diene is 1,3-butadiene.

A number of unsaturated acid monomers may be used in the polymer latex composition. Exemplary monomers of this type include, but are not limited to, unsaturated mono- or dicarboxylic acid monomers such as acrylic acid, methacrylic acid, itaconic acid, fumaric acid, maleic acid, and the like. Derivatives, blends, and mixtures of the above may be used. Methacrylic acid is preferably used. In addition to the composition recited herein, the unsaturated acid monomer may be used in an amount ranging from about 1 to about 5 percent based on the weight of the monomers. Partial esters of unsaturated polycarboxylic acids in which at least one carboxylic group has been esterified may also be used.

In accordance with the invention, the polymer latex composition may also include an additional unsaturated monomer. The additional unsaturated monomer may be employed for several reasons. For example, the additional unsaturated monomer may aid in processing, more specifically, help to reduce the time of polymerization of the latex. The presence of the additional unsaturated monomer may also help in enhancing the physical properties of a film, glove, or other article containing the polymer latex composition. A number of unsaturated monomers may be used and are well known to the skilled artisan. Examples include, but are not limited to, ester monomers, nitrogen-containing monomers, and aromatic monomers. Mixtures of the above may be used. In addition to the range recited herein, the additional unsaturated monomer may be used from about 5 to about 15 based on the weight of the monomers.

The ester monomers which may be used are well known and include, for example, acrylates and methacrylates. The acrylates and methacrylates may include functional groups such as amino groups, hydroxy groups, epoxy groups and the like. Exemplary acrylates and methacrylates include monocarboxylic ester monomers such as, but not limited to, methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate, and the like. Exemplary amino-functional methacrylates include t-butylamino ethyl methacrylate and dimethylamino ethyl methacrylate. Suitable non-aromatic dicarboxylic ester monomers may also be used such as, for example, alkyl and dialkyl fumarates, itaconates and maleates, with the alkyl group having one to eight carbons, with or without functional groups. Specific monomers include diethyl and dimethyl fumarates, itaconates and maleates. Other suitable ester monomers include di(ethylene glycol) maleate, di(ethylene glycol) itaconate, bis(2-hydroxyethyl) maleate, 2-hydroxyethyl methyl fumarate, and the like. The mono and dicarboxylic acid esters monomers may be blended or copolymerized with each other.

Ester monomers which may be used in the polymer latex composition also include, for example, partial esters of unsaturated polycarboxylic acid monomers. These monomers typically include unsaturated di- or higher acid monomers in which at least one of the carboxylic groups is esterified. One example of this class of monomers is of the formula ROOC—CH=CH—COOH wherein R is a $C_1$ to $C_{12}$ alkyl group, for example monomethyl maleate, monobutyl maleate and monooctyl maleate. Half esters of itaconic acid having $C_1$ to $C_{12}$ alkyl groups such as monomethyl itaconate can also be used. Other mono esters, such as those in which R in the above formula is an oxyalkylene chain instead of alkyl can also be used. Blends or copolymers of the partial ester of the unsaturated polycarboxylic acid monomer can also be used.

Nitrogen-containing monomers which may be employed include, for example, acrylamide, N-methyolacrylamide, N-methyolmethacrylamide, methacrylamide, N-isopropylacrylamide, -tert-butylacrylamide, N-N'-methylene-bis-acrylamide; alkylated N-methylolacrylamides such as N-methoxymethylacrylamide and N-butoxymethylacrylamide; acrylonitrile and methacrylonitrile. Blends and mixtures of the above may be used.

For the purposes of the invention, the term "aromatic monomer" is to be broadly interpreted and include, for example, aryl and heterocyclic monomers. Exemplary aromatic vinyl monomers which may be employed in the polymer latex composition include styrene and styrene derivatives such as alpha-methyl styrene, p-methyl styrene, vinyl toluene, ethylstyrene, tert-butyl styrene, monochlorostyrene, dichlorostyrene, vinyl benzyl chloride, vinyl pyridine, vinyl naphthalene, fluorostyrene, alkoxystyrenes (e.g., p-methoxystyrene), and the like, along with blends and mixtures thereof.

The polymer latex composition may also include other components such as, for example, urethanes, epoxies, melamine-formaldehyde resins, and conjugated diene polymers (e.g., polybutadiene, polyisoprene, and polychloroprene). Blends, derivatives, and mixtures thereof may also be used.

Conventional surfactants and emulsifying agents can be employed in the polymer latex composition. Polymerizable surfactants that can be incorporated into the latex also can be used. For example, anionic surfactants can be selected from the broad class of sulfonates, sulfates, ethersulfates, sulfosuccinates, and the like, the selection of which will be readily apparent to anyone skilled in the art. Nonionic surfactants may also be used to improve film and glove characteristics, and may be selected from the family of alkylphenoxypoly(ethyleneoxy)ethanols where the alkyl group typically varies from $C_7$–$C_{18}$ and the ethylene oxide units vary from 4–100 moles. Various preferred surfactants in this class include the ethoxylated octyl and nonyl phenols. Ethoxylated alcohols are also desirable surfactants. A typical anionic surfactant is selected from the diphenyloxide disulfonate family, such as benzenesulfonic acid, dodecyloxydi-, disodium salt. In addition to, or in place of the surfactants, a polymeric stabilizer may be used in the composition of the invention.

An initiator which facilitates polymerization of the latex composition may include, for example, materials such as persulfates, organic peroxides, peresters, and azo compounds such as azobis(isobutyronitrile)(AIBN). Common initiators include those such as, for example, cumene hydroperoxide, diisopropylbenzene hydroperoxide, and tert butyl hydroperoxide. Preferred initiators are persulfate initiators such as, for example, ammonium persulfate and potassium persulfate. Redox initiators which are well known to one skilled in the art can also be used.

The polymer can include crosslinking agents and other additives, the selection of which will be readily apparent to one skilled in the art. Exemplary crosslinking agents include vinylic compounds (e.g., divinyl benzene); allyllic compounds (e.g., allyl methacrylate, diallyl maleate); and multifunctional acrylates (e.g., di, tri and tetra (meth)acrylates), sulfur, metal complexes, metal salts, and metal oxides (e.g., zinc oxide). Peroxides may also be used. Additional ingredients which may be used include, but are not limited to, chelating agents (e.g., ethylenediaminetetraacetic acid), dispersants (e.g., salts of condensed naphthalenesulfonic acid); buffering agents (e.g., ammonium hydroxide); and polymerization inhibitors (e.g., hydroquinone). Chain transfer agents (e.g., t-dodecyl mercaptan) may also be used in the invention, preferably less than about 2 percent based on the weight of the monomers. More preferably, the chain transfer agent is used from about 0.3 to about 1.5 weight percent, and most preferably from about 0.3 to about 1.0 weight percent.

The monomers used in forming the polymer latex composition of the invention may be polymerized in a manner known to those who are skilled in the art. For example, the monomers may be polymerized at a temperature preferably between about 5° C. and 95° C., and more preferably between about 10° C. and 70° C.

The invention also relates to a crosslinked film formed from a polymer latex composition described herein. Numerous articles of manufacture can be formed from the crosslinked film and polymer latex composition according to the process of the invention. Such latex articles generally include those which are typically made from natural rubber and which contact the human body. Exemplary articles of manufacture include, but are not limited to, gloves, condoms, medical devices, catheter tubes, balloons, and blood pressure bags. Exemplary techniques are described in U.S. Pat. No. 5,084,514 to Szczechura et al., the disclosure of which is incorporated by reference herein in its entirety. Typically, the polymer latex composition is compounded with one or more crosslinkers (e.g., metal oxides such as zinc oxide, sulfur, and peroxides), along with antioxidants, fillers, and other ingredients. The compounding or mixing may be done in any suitable manner. Suitable forms or molds in the shape of a hand are heated in an oven, and then immersed or dipped into a coagulant. A suitable coagulant includes, for example, a solution of a metal salt, preferably calcium nitrate, in water or alcohol. The form is then withdrawn from the coagulant, and the excess liquid is permitted to dry. As a result, a residual coating of coagulant is left on the form.

The form coated with the coagulant is then immersed or dipped into the polymer latex composition of the present invention. The latex coagulates and forms a film on the form. The amount of time the form is immersed in the latex typically determines the thickness of the film. The longer the dwell time, the thicker the film.

The form is then removed from the latex, and is immersed in a water bath to remove the coagulant and some of the surfactant. The latex coated form is then placed in a drying oven at a temperature preferably between about 60° C. and about 100° C. to remove water from the film. When the film is dry, the mold is placed in a curing oven preferably at a temperature between about 100° C. and 170° C. for about 5 to about 30 minutes. If desired, the same oven can be used for drying and curing, and the temperature can be increased with time.

The cured glove is removed from the form. It may be powdered or postprocessed for ease of removal and for ease of donning. The glove preferably has a thickness ranging from about 3 mil to about 20 mil.

The crosslinked film and glove formed in accordance with the present invention may have various physical properties. Preferably, the above materials have a tensile strength of at least about 1000 psi, an elongation of at least about 600 percent, and a modulus at 100 percent elongation of no more than about 300 psi. More preferably, the materials have a tensile strength of at least about 1500 psi, an elongation of at least about 650 percent, and a modulus at 100 percent elongation of no more than about 250 psi.

In addition to the above, the crosslinked film and glove produced in accordance with the invention can contain additional (at least a second) polymeric films in contact thereto so as to form composite structures. The application of the additional polymeric films may be achieved by techniques which are known in the art. For example, the polymeric films may be formed on the crosslinked film and glove by coating, spraying, or "overdipping". The resulting materials may then be dried and cured in accordance with known and accepted techniques. The additional polymeric films may be formed from a wide number of materials including, but not limited to, neoprene, nitrites, urethanes, acrylics, polybutadiene, polyisoprene, and the like. Mixtures of the above may also be used. The additional polymeric films may be present in a variety of configurations. For example, in one embodiment, an additional film may be positioned above the crosslinked film. In a second embodiment, an additional film may be positioned below the crosslinked film. In a third embodiment, the crosslinked film may be located between two additional films. The configurations of different films may be selected as desired by the skilled artisan.

The crosslinked film of the invention may be used in conjunction with other conventional materials, such as textile substrate which may be present in the form of an article such as a glove, for example. As an example, support gloves are well known in the art. In this instance, the crosslinked film typically cover the textile substrate, although other configurations are possible. For the purposes of the invention, the term "textile" is to be broadly interpreted and may be formed from a variety of polymeric and natural materials such as, but not limited to, nylon, polyester, and cotton. Blends and mixtures thereof may also be used.

The following examples are merely illustrative of the invention, and are not limiting thereon.

EXAMPLE 1

150 parts per hundred of monomer (phm) of demineralized water was mixed with 94 parts of butadiene and 6 parts of methacrylic acid in the presence of 0.05 phm of ethylene diamine tetraacetic acid (EDTA), 2.75 phm of sodium dodecyl benzene sulfonate, 0.6 phm of t-dodecyl mercaptan, 0.05 phm of potassium persulphate, 0.1 phm of tetra potassium pyro phosphate, and 0.1 phm of sodium salt of condensed naphthalenesulfonic acid in a bottle reactor. The mixture was agitated and the temperature was raised to 45° C. The temperature was incrementally raised to 50° C. After the reaction proceeded for 20.25 hours, it was stopped upon the addition of hydroquinone. The conversion was determined to be 96 percent. The pH of the latex was raised to between 7 and 7.5 by the addition of ammonium hydroxide. The latex polymer had a glass transition temperature ($T_g$) of –81° C.

EXAMPLE 2

The latex made in Example 1 was combined with 0.5 phm of sodium dodecyl benzene sulfonate, and the pH of the latex was raised to 8.5 using ammonium hydroxide. The latex was further compounded with 0.25 phr of zinc dibutyl dithiocarbamate, 0.5 phr of sulfur, and 2.0 phr of ZnO.

The compounded latex was then coagulated into a crosslinked film by first immersing a metal plate into a coagulant at 70° C. The coagulant was a 35 percent solution of calcium nitrate in alcohol. The immersed metal plate was partially dried, and then immersed into the latex for 30 to 60 seconds. A 8–12 mil film of polymer was deposited on the plate. The film was then leached in warm water and dried in an oven at 70° C. for two hours, and finally cured for 15 minutes at 132° C.

The tensile properties of the film were measured using ASTM D-412 and are given below:

| M100 | M200 | M300 | M400 | M500 | $T_b$ | E % |
|---|---|---|---|---|---|---|
| 160 | 213 | 283 | 290 | 585 | 1095 | 612 |

M100–M500: modulus (psi)
$T_b$: tensile strength (psi)
e %: percent elongation

The film displayed good strength and elongation properties.

EXAMPLE 3

A latex composition similar to that in Example 1 was prepared with 87 phm butadiene, 10 phm acrylonitrile, and 3 phm methacrylic acid. After 10.25 hours, the conversion was 91.8 percent. The pH was raised to 8.3 by the addition of ammonium hydroxide, and the latex was stripped to a total solids content of 44.2 percent. The latex was then compounded with 0.5 phr of surfactant (i.e., benzenesulfonic acid, dodecyloxydi-, disodium salt), 2.5 phr of ZnO, 0.5 phr of sulfur, and 0.25 phr of zinc butyl dithiocarbamate was used. The compounded latex was coagulated into a crosslinked film using the procedure outlined in Example 2. The polymer latex had a glass transition temperature ($T_g$) of –73° C.

The tensile properties of the film were measured using ASTM D-412 and are given below:

| M100 | M200 | M300 | M400 | M500 | $T_b$ | E % |
|---|---|---|---|---|---|---|
| 213 | 293 | 378 | 501 | 698 | 1872 | 715 |

The film was soft, and had excellent drape and snap (elastic recovery).

EXAMPLE 4

A latex made in Example 3 was made into thin gloves using the following procedure. The latex was diluted to 30 percent solids, and compounded with 0.5 phr surfactant (i.e., benzenesulfonic acid, dodecyloxydi-, disodium salt), 2.5 phr of ZnO, 0.5 phr of sulfur, and 0.25 phr of zinc dibutyl dithiocarbamate. Glove forms were then heated to 70° C. and immersed in a 36 percent solution of calcium nitrate in water. The form was placed in an oven for 4 minutes at 70° C., and then immersed in the compounded latex for 5 to 10 seconds. A thin film of latex was deposited on the form. The form was leached in warm water for 3 minutes, and dried in an oven at 70° C. for 20 minutes. The film was finally cured for 10 minutes at 132° C. The glove was then removed from the form.

The tensile properties of the glove were measured using ASTM D-412 and are given below:

| M100 | M200 | M300 | M400 | M500 | $T_b$ | E % |
|---|---|---|---|---|---|---|
| 242 | 334 | 426 | 559 | 780 | 1757 | 680 |

The glove was 5–6 mil in thickness, and displayed excellent snap (elastic recovery).

EXAMPLE 5

A latex composition similar to Example 1 was prepared with 87 phm of butadiene, 10 phm of methyl methacrylate, and 3 phm of methacrylic acid. After 14 hours, the conversion was 91.2 percent. The pH was raised to 8.4 by the addition of ammonium hydroxide, and the latex was stripped to 44.9 percent solids. The latex was compounded with 0.5 phm of surfactant (i.e., benzenesulfonic acid, dodecyloxydi, disodium salt), 2.5 phr of ZnO, 0.5 phm of sulfur, and 0.25 phm of zinc dibutyl dithiocarbamate. The compounded latex was coagulated into a crosslinked film using the procedure outlined in Example 2. The latex composition had a glass transition temperature ($T_g$) of –74° C.

The tensile properties of the film were measured using ASTM D-412 and are given below:

| M100 | M200 | M300 | M400 | M500 | $T_b$ | E % |
|---|---|---|---|---|---|---|
| 178 | 225 | 277 | 354 | 472 | 1044 | 705 |

The film was soft, silky white, and had excellent drape and snap (elastic recovery).

EXAMPLE 6

Elastic recovery (i.e., snap) of various gloves was evaluated by a random sampling of 10 individuals. The snap was quantified on a scale of 1 to 10, with 1 representing the worst snap and 10 representing the best snap. The results were as follows:

| Glove Type | Snap Value |
| --- | --- |
| Natural Rubber Glove | 8.2 |
| Glove from Example 4 of the Invention | 8.2 |
| Vinyl glove (PVC) | 1.9 |

As shown, the glove illustrated in Example 4 of the invention displayed good snap properties.

EXAMPLE 7

Tan * values were calculated for the glove samples listed in Example 6. Tan * represents the ratio of the loss modulus to the storage modulus determined by conventional tests. The films were characterized using a Rheometrics Dynamic Mechanical Analysis Instrument. The experiment was performed at a temperature of 25° C. in the tensile mode, and at a sample frequency of 10 radians per second. The higher the tan * value, the more viscous the sample, and the lower the tan * value, the more elastic the sample. The results of the tests were as follows:

| Glove Type | Tan * |
| --- | --- |
| Natural Rubber Glove | 0.043 |
| Glove from Example 4 of the Invention | 0.075 |
| Vinyl Rubber (PVC) | 0.25 |

As shown, the glove from Example 4 displayed a desirable Tan * value. Specifically, the glove displayed improved elasticity over the PVC glove.

In the specification and examples, there have been disclosed typical preferred embodiments of the invention and, although specific terms are employed, they are used in a generic and descriptive sense only and not for purposes of limitation of the scope of the invention being set forth in the following claims.

That which is claimed is:

1. A crosslinked film formed from a polymer latex composition, said polymer latex composition comprising:
   about 80 to about 99 weight percent of an aliphatic conjugated diene monomer;
   above 0 to about 10 weight percent of unsaturated acid monomer; and
   from 0 to about 20 weight percent of an additional unsaturated monomer;
   wherein said crosslinked film has a glass transition temperature of no greater than about −50° C. and a level of crosslinking such that the crosslinked film has a tensile strength of at least about 1000 psi, an elongation of at least about 600 percent, and a modulus at 100 percent elongation of no more than about 300 psi.

2. The crosslinked film according to claim 1, wherein said conjugated diene monomer is butadiene.

3. The crosslinked film according to claim 1, wherein said unsaturated acid monomer is methacrylic acid.

4. The crosslinked film according to claim 1, wherein said additional unsaturated monomer is selected from the group consisting of ester monomers, nitrogen-containing monomers, aromatic monomers, and mixtures thereof.

5. The crosslinked film according to claim 1, wherein said polymer latex composition further comprises a component selected from the group consisting of a urethane, epoxies, melamine-formaldehyde resins, a conjugated diene polymer, and blends thereof.

6. The crosslinked film according to claim 1, further comprising a second polymeric film in contact with said crosslinked film to form a composite film structure.

7. A glove comprising a crosslinked film formed from a polymer latex composition, the polymer latex composition comprising about 80 to about 99 weight percent of a conjugated diene monomer, above 0 to about 10 weight percent of unsaturated acid monomer, and from 0 to about 20 weight percent of an additional unsaturated monomer, wherein said crosslinked film has a glass transition temperature of no greater than about −50° C. and a level of crosslinking such that the crosslinked film has a tensile strength of at least about 1000 psi, an elongation of at least about 600 percent, and a modulus at 100 percent elongation of no more than about 300 psi.

8. The glove according to claim 7, wherein said conjugated diene monomer is butadiene.

9. The glove according to claim 7, wherein said unsaturated acid monomer is methacrylic acid.

10. The glove according to claim 7, wherein said additional unsaturated monomer is selected from the group consisting of ester monomers, nitrogen-containing monomers, aromatic monomers, and mixtures thereof.

11. The glove according to claim 7, wherein said composition further comprises a component selected from the group consisting of a urethane, epoxies, melamine-formaldehyde resins, a conjugated diene polymer, and blends thereof.

12. The glove according to claim 7, wherein said glove further comprises a second polymeric film in contact with said glove to form a composite structure.

13. A method for making a glove comprising:
   contacting a mold in the shape of a glove with a coagulant;
   contacting the mold containing the coagulant with a polymer latex composition, the polymer latex composition comprising about 80 to 99 weight percent of a conjugated diene monomer, above 0 to 10 weight percent of an unsaturated acid monomer, and from 0 to about 20 weight percent of an additional unsaturated monomer, the polymer latex composition having a glass transition temperature of no greater than about −50° C.; and
   curing the polymer latex composition which is present on the mold to form a glove from the composition, the glove having a tensile strength of at least about 1000 psi, an elongation of at least about 600 percent, and a modulus at 100 percent elongation of no more than about 300 psi.

14. The method according to claim 13, wherein said conjugated diene monomer is butadiene.

15. The method according to claim 13, wherein said unsaturated acid monomer is methacrylic acid.

16. The method according to claim 13, wherein said additional unsaturated monomer is selected from the group consisting of ester monomers, nitrogen-containing monomers, aromatic monomers, and mixtures thereof.

17. The method according to claim 13, wherein said composition further comprises a component selected from the group consisting of a urethane, epoxies, melamine-formaldehyde resins, a conjugated diene polymer, and blends thereof.

18. An article of manufacture comprising the crosslinked film recited in claim 1.

19. The article of manufacture according to claim 18, wherein the conjugated diene monomer is butadiene.

20. The article of manufacture according to claim 18, wherein the unsaturated acid monomer is methacrylic acid.

21. The article of manufacture according to claim 18, wherein the additional unsaturated monomer is selected from the group consisting of ester monomers, nitrogen-containing monomers, aromatic monomers, and mixtures thereof.

22. The article of manufacture according to claim 18, wherein the polymer latex composition further comprises a component selected from the group consisting of a urethane, epoxies, melamine-formaldehyde resins, a conjugated diene polymer, and blends thereof.

23. The article of manufacture according to claim 18, further comprising a second polymeric film in contact with said crosslinked film such that said article of manufacture is present as a composite structure.

* * * * *